United States Patent
Smith

(10) Patent No.: US 7,600,321 B2
(45) Date of Patent: Oct. 13, 2009

(54) METHOD OF SWAGING A SPHERICAL BEARING

(75) Inventor: Paul Raymond Smith, Lincoln (GB)

(73) Assignee: Minebea Co. Ltd., Nagano (JP)

( * ) Notice: Subject to any disclaimer, the term of this patent is extended or adjusted under 35 U.S.C. 154(b) by 736 days.

(21) Appl. No.: 10/551,198

(22) PCT Filed: Mar. 25, 2004

(86) PCT No.: PCT/GB2004/001303

§ 371 (c)(1),
(2), (4) Date: Sep. 27, 2005

(87) PCT Pub. No.: WO2004/087368

PCT Pub. Date: Oct. 14, 2004

(65) Prior Publication Data

US 2006/0185171 A1 Aug. 24, 2006

(30) Foreign Application Priority Data

Mar. 31, 2003 (GB) ................................. 0307407.7

(51) Int. Cl.
*B21K 1/10* (2006.01)
*B23P 11/02* (2006.01)
(52) U.S. Cl. .................. 29/898.044; 29/898; 29/441.1; 29/447
(58) Field of Classification Search ............ 29/898.062, 29/898.061, 898, 898.044, 898.045, 441.1, 29/447, 898.064, 898.043
See application file for complete search history.

(56) References Cited

U.S. PATENT DOCUMENTS

| 2,947,063 | A | | 8/1960 | Teeple |
| 2,995,813 | A | | 8/1961 | Board |
| 3,068,552 | A | | 12/1962 | Williams et al. |
| 4,242,784 | A | | 1/1981 | McCloskey |
| 4,278,307 | A | | 7/1981 | Olschewski et al. |
| 5,086,560 | A | | 2/1992 | Glazier |
| 5,150,636 | A | * | 9/1992 | Hill ............................ 76/108.2 |
| 5,421,088 | A | * | 6/1995 | Kawamura ............. 29/898.062 |

FOREIGN PATENT DOCUMENTS

| GB | 2 400 146 | 10/2004 |
| SU | 1227839 | 4/1986 |

OTHER PUBLICATIONS

Combined Search and Examination Report for corresponding UK Patent Application No. GB 0307407.7, Sep. 29, 2003.

* cited by examiner

*Primary Examiner*—David P Bryant
*Assistant Examiner*—Sarang Afzali
(74) *Attorney, Agent, or Firm*—Klarquist Sparkman, LLP

(57) ABSTRACT

A method of swaging a spherical bearing comprising a ball and a bearing housing, the method comprising: providing a ball and a bearing housing to be swaged around the ball; creating a temperature differential between the temperature of the housing and the temperature of the ball, the ball being at a lower temperature than the housing such that the relative size of the ball with respect to the housing decreases; inserting the ball in the housing; swaging the housing around the ball, the ball being cooler than the housing during the swaging process; allowing the ball and housing to return to ambient temperature such that the relative size of the ball with respect to the housing increases.

15 Claims, 1 Drawing Sheet

METHOD OF SWAGING A SPHERICAL BEARING

This is the U.S. National Stage of International Application No. PCT/GB2004/001303, filed Mar. 25, 2004, which in turn claims the benefit of Great Britain Patent Application No. GB 0307407.7, filed Mar. 31, 2003.

This invention relates to a method of swaging and more particularly to a method of swaging a spherical bearing comprising a ball and a housing, the bearing housing to be swaged on to the ball.

The process of swaging a bearing housing around a ball to complete the assembly of a spherical bearing is a well-known process and various swaging techniques can be used such as taper die swaging or half-cup swaging.

The so-called spring-back effect occurs when swaging pressure is released from the swaged material which returns some way back to its pre-swaging condition, potentially creating a gap between the ball and the housing or, at least, not a close fit between the ball and the housing—see FIG. 2 of the accompanying drawings.

Particularly when swaging dissimilar materials, for example, a copper ball and a steel housing, care must be taken in swaging the harder material, the steel housing, onto the softer copper ball so as not to deform the softer material by creating an irregularly shaped ball or a bad fit between ball and housing. Further, when swaging similar materials, it is common to over-swage the housing on to the ball so that any spring-back in the swaged material is compensated. If spring-back is not compensated, then the swaged part of the housing will not conform to the shape of the ball meaning a gap is created between the edge of the swaged housing and the ball resulting in a loose fitting bearing. Consequently, whilst over-swaging can be used to remove or minimise spring-back effects so that the inner surface of the swaged housing conforms to the shape of the ball when swaging similar materials, over-swaging cannot be used as a spring-back compensation method when swaging dissimilar materials.

The present invention seeks to provide a swaging technique to swage a housing onto a ball to produce a spherical bearing, which technique ameliorates the problems with conventional swaging processes.

Accordingly, one aspect of the present invention provides a method of swaging a spherical bearing comprising a ball and a bearing housing, the method comprising the steps of:

providing a ball and a bearing housing to be swaged around the ball;

creating a temperature differential between the temperature of the housing and the temperature of the ball, the ball being at a lower temperature than the housing such that the relative size of the ball with respect to the housing decreases;

inserting the ball in the housing;

swaging the housing around the ball, the ball being cooler than the housing during the swaging process;

allowing the ball and housing to return to ambient temperature such that the relative size of the ball with respect to the housing increases.

In order that the present invention may be more readily understood, embodiments thereof will now be described, by way of example, with reference to the accompanying drawings, in which.

Figure 1:
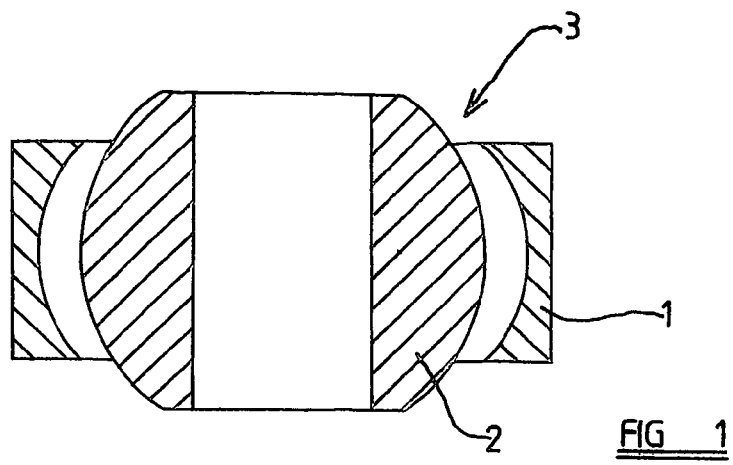
FIG. 1 is a schematic cross section of a spherical bearing comprising a ball and a bearing housing before the bearing housing is swaged on to the ball.
Figures 2, 3:
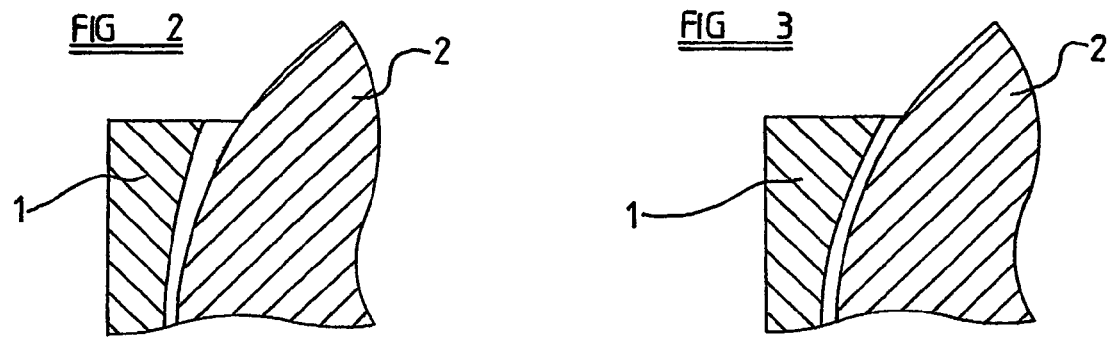
FIG. 2 is a schematic cross-sectional detail of the fit between a ball and a bearing housing after the bearing housing has been swaged on to the ball using a conventional swaging technique.
FIG. 3 is a schematic cross-sectional detail of the fit between a ball and a bearing housing after the housing has been swaged on to the ball in accordance with a method embodying the present invention.
Figure 4:
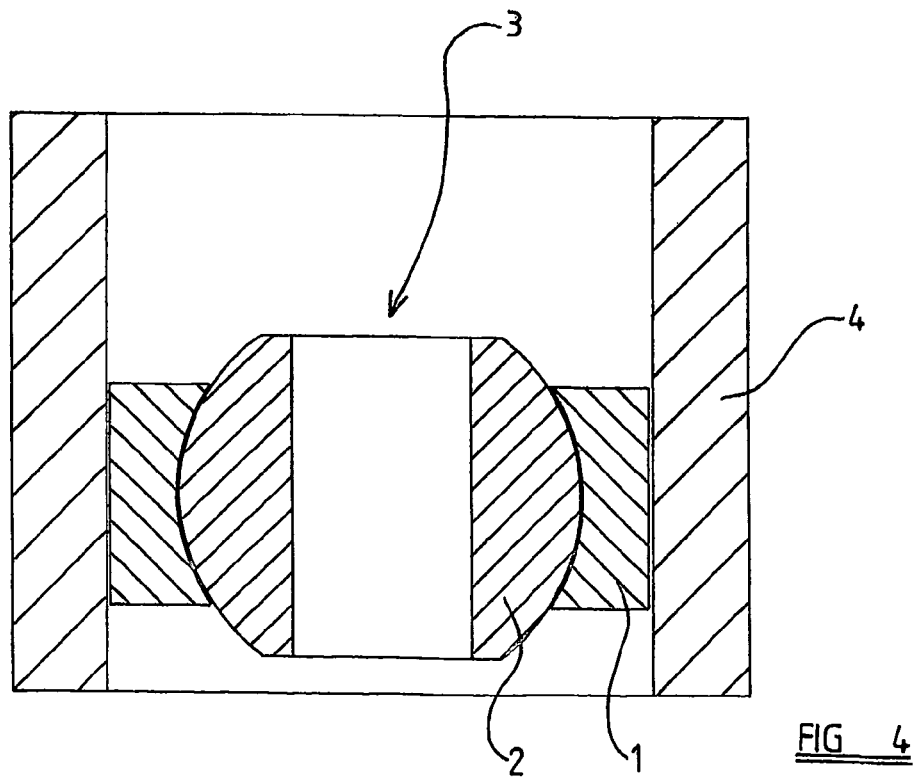
FIG. 4 is a schematic cross-section of a spherical bearing being swaged in a taper die swaging process.

Referring to FIG. 1, in a swaging process such as a taper die swaging process (as shown in FIG. 4), a bearing housing 1 is to be swaged on to a ball 2 to create a spherical bearing 3. FIG. 1 shows the ball 2 and housing 1 before swaging. In accordance with embodiments of the present invention, prior to swaging, a temperature differential is established between the temperature of the housing 1 and the temperature of the ball 2. Preferably, this is established by cooling the ball 2 in liquid nitrogen until the ball has reached the temperature of the liquid nitrogen (−196° C.). Of course, any other convenient cold medium can be used to cool the ball 2.

In the cooling process, thermal contraction takes place and the ball 2 reduces in size relative to the size of the housing since the housing 1 is maintained at ambient temperature.

Once the ball 2 has been cooled to a desired temperature and thermal contraction has taken place, the cooled ball 2 is seated in the housing 1 and the housing 1 is swaged on to the cooled ball. Over-swaging is avoided to minimise stress on the ball 2 and prevent deformation of the ball 2. After completion of the swaging process, the spherical bearing 3 is removed from the swaging apparatus, be it a taper die or the like, and the spherical bearing 3 is allowed to return to ambient temperature—i.e. both parts of the spherical bearing 3, the housing 1 and the ball 2, return to ambient temperature. In returning to ambient temperature, the ball 2 will undergo thermal expansion effectively growing with respect to the size of the housing and taking up any spring-back effects latent in the swaged housing 1 to produce a spherical bearing 3 with a close-fit between ball and housing.

The temperature differential between the housing 1 and the ball 2 can be achieved also by heating the housing 1 as opposed to cooling the ball 2 or, alternatively, thermal expansion of the housing 1 can be caused by heating the housing 1 in combination with cooling the ball 2 which will undergo thermal contraction. Swaging can then take place on the heated housing 1 on to the cooled ball 2, although thermal stresses should be monitored.

In practice, liquid nitrogen offers a convenient cold medium to cool the ball. Cooling the ball in liquid nitrogen until the ball stops effervescing in the liquid nitrogen allows the ball to drop in temperature to in the region of −196° C. whereupon significant contraction of the ball 2 has taken place.

In the above example, the ball is manufactured from a copper-based material and the housing is manufactured from steel. It is possible to use the above-described swaging technique when the material of the ball and the housing are the same or similar, but it should be noted that the above technique is particularly advantageous for swaging a housing on to a ball where the housing and ball are made from dissimilar materials.

It should be noted that if one of the two parts of the spherical bearing is softer than the other, then there will be deformation of the softer material which is disadvantageous in itself, but also contributes to increased spring-back. Previously, unacceptable results have been achieved when swaging dissimilar materials using a taper die swage such as that shown schematically in FIG. 4, because of the large bulk of material of the housing to be swaged. Swaging dissimilar materials is not such a problem with a half-cup swage since only a thin lip of the housing material needs to be swaged in that instance. However, the processes embodying the present invention are still advantageous using a half-cup swage over conventional processes since a close-fit spherical bearing with improved tolerances is made possible.

A further improvement in the fit between ball 2 and housing 1 can be achieved when performing a half-cup swage by preforming the inner surface of the housing to be swaged. The inner surface of the housing to be swaged on to the ball 2 is normally straight but, in this improvement, the inner surface of the housing is machined to be slightly concave. When swaged onto the ball, the slight concavity improves the close fit and further reduces any spring-back effect.

In the present specification "comprises" means "includes or consists of" and "comprising" means "including or consisting of".

The features disclosed in the foregoing description, or the following claims, or the accompanying drawings, expressed in their specific forms or in terms of a means for performing the disclosed function, or a method or process for attaining the disclosed result, as appropriate, may, separately, or in any combination of such features, be utilised for realising the invention in diverse forms thereof.

The invention claimed is:

1. A method of swaging a spherical bearing comprising a ball and a bearing housing, the method comprising:
   providing a ball and a bearing housing to be swaged around the ball;
   creating a temperature differential between the temperature of the housing and the temperature of the ball, the ball being at a lower temperature than the housing such that the relative size of the ball with respect to the housing decreases;
   inserting the ball in the housing;
   swaging the housing around the ball, the ball being cooler than the housing during the swaging process; and
   allowing the ball and housing to return to ambient temperature such that the relative size of the ball with respect to the housing increases wherein the temperature differential is created by cooling the ball.

2. A method according to claim 1, wherein the ball is manufactured of a first material and the housing is manufactured of a second material, the two materials being different from one another.

3. A method according to claim 2, wherein the temperature differential also is caused by heating the housing.

4. A method according to claim 3, wherein the ball is cooled to below 0° C.

5. A method according to claim 4, wherein the ball is cooled by liquid nitrogen.

6. A method according to claim 2, wherein the act of swaging comprises a taper die swaging process.

7. A method according to claim 1, wherein the ball is cooled to below 0° C.

8. A method according to claim 7, wherein the ball is cooled by liquid nitrogen.

9. A method according to claim 8, wherein the temperature differential also is caused by heating the housing.

10. A method according to claim 7, wherein the temperature differential also is caused by heating the housing.

11. A method according to claim 1, wherein the temperature differential also is caused by heating the housing.

12. A method according to claim 11, wherein the act of swaging comprises a taper die swaging process.

13. A method according to claim 1, wherein the act of swaging comprises a taper die swaging process.

14. A method according to claim 13, wherein the tapered die swaging process comprises placing the ball and the housing in a tapered opening of a die and swaging the housing around the ball.

15. A method according to claim 1, wherein the act of swaging comprises reducing a gap between the ball and an inner surface of the housing.

* * * * *